United States Patent Office 2,734,904
Patented Feb. 14, 1956

2,734,904

ACYL GUANIDINES AND PROCESSES FOR THE MANUFACTURE THEREOF

Robert R. Burtner, Skokie, Ill., assignor to G. D. Searle & Co., Chicago, Ill., a corporation of Illinois No Drawing. Application April 6, 1954,
Serial No. 421,425

14 Claims. (Cl. 260—295)

This invention relates to acyl guanidines and to processes for the preparation thereof. More particularly, this invention relates to compounds of the formula $$R-Alk-\underset{\underset{O}{\|}}{C}-NH-\underset{\underset{NH}{\|}}{C}-NH_2$$

wherein R is a monovalent 5- or 6-membered heterocyclic radical, or a lower alkoxy- or halogen-substituted phenyl radical; and Alk is a bivalent hydrocarbon radical containing at least 2 and not more than 3 carbon atoms.

In the foregoing structural formula, R represents such heterocyclic radicals as furyl ($C_4H_3O-$), pyranyl ($C_5H_5O-$), pyridyl ($C_5H_4N-$), and thienyl ($C_4H_3S-$) radicals. Additionally, R represents such lower alkoxy- and halogen-substituted phenyl radicals as chlorophenyl ($C_6H_4Cl-$), dichlorophenyl ($C_6H_3Cl_2-$), dimethoxyphenyl ($diMeOC_6H_3-$), iodophenyl ($C_6H_4I-$), and methoxyphenyl ($MeOC_6H_4-$) radicals. The hydrocarbon radicals comprehended by Alk as hereinabove defined include alkylene radicals—in particular those bivalent, saturated, acyclic, straight- or branched-chain hydrocarbon radicals of empirical formula $$C_nH_{2n}$$

wherein $n$ is a positive integer greater than 1 and less than 4—and alkenylene radicals—for the purposes of this invention, either vinylene ($-CH=CH-$) radicals or bivalent, acyclic, straight- or branched-chain hydrocarbon radicals derived from alkylvinylene radicals and having the empirical formula $$C_nH_{2n-2}$$

wherein $n$ has the meaning assigned above. Alk is thus seen to embrace such radicals as 1,2-ethylene $$(-CH_2CH_2-)$$

1-methyl-1,2-ethylene $$\underset{\underset{|}{CH_3}}{(-CHCH_2-)}$$

trimethylene ($-CH_2CH_2CH_2-$), 1,3-propenylene $$(-CH_2CH=CH-)$$

and 2-methyl-1,2-vinylene $$\underset{\underset{|}{CH_3}}{(-CH=C-)}$$

as well as such other alkylene and alkenylene radicals as fall within the purview of the aforesaid definition and terms.

Equivalent to the amine bases of this invention and likewise adapted to its uses are the non-toxic acid additions salts formed by interaction of the claimed compounds with one equivalent of an inorganic or strong organic acid. These salts may be represented by the formula $$R-Alk-\underset{\underset{O}{\|}}{C}-NH-\underset{\underset{NH}{\|}}{C}-\overset{+}{N}H_2X^-$$

wherein R and Alk are defined as above and X is one equivalent of an anion—for example, chloride, bromide, iodide, methyl sulfate, ethyl sulfate, benzenesulfonate, toluenesulfonate, tartrate, succinate, malate, acetate, citrate, nitrate, sulfate, phosphate, sulfamate, and the like—which, in combination with the cationic portion of a salt aforesaid is neither toxic nor otherwise undesirable in pharmaceutical dosage.

The compounds of this invention are useful in medicine as diuretics. They have the property of augmenting the output of urine, producing a significant loss of body weight and decreased dyspnea in cases of edema associated with congestive cardiac failure, renal disease, cirrhosis of the liver, and other common pathologic states. Unlike the mercurial and xanthene diuretics well known to the art, the compounds of the present invention are characterized by relatively low toxicity and a minimal incidence of side effects, which circumstance correspondingly enhances their value in the restoration of normal renal function.

The amine bases which comprise this invention are relatively insoluble in water but may be dissolved in dilute acids and in most of the common organic solvents. The equivalent acid addition salts are, on the other hand, slightly soluble in water and in aqueous solutions of alcohols or other water-miscible organic solvents. The subject compounds may be administered in solid form as tablets; dissolved in aqueous media, they may be given parenterally.

The compounds to which this invention relates are conveniently prepared by reacting guanidine with an ester of the formula $$R-Alk-COOZ$$

wherein R and Alk have the meanings hereinabove assigned and Z is a lower alkyl radical. No solvent is required for the reaction, which proceeds at temperatures ranging from 65° to 120° centigrade. Crystallization of the products thus obtained is ofttimes facilitated by allowing the reactants—following initial heating—to cool to room temperatures and remain thereat for periods of time ranging from 12 hours to several days. The ester intermediates used in synthesis of the instant compounds are in part obtained from commercial sources, others being derived by means of the Perkin reaction, wherein an appropriate aromatic aldehyde is heated with the anhydride of a selected aliphatic acid and the sodium or potassium salt of the same acid. (Thus, for example, 2-iodobenzaldehyde reacts with acetic anhydride and sodium acetate at 180° centigrade over an 8 hour period of time to give—in good yield—o-iodocinnamic acid.) The acids thus obtained are, in turn, esterified by conventional means—for example, using the Fischer-Speier method, wherein the acid and a lower alcohol such as methyl or ethyl alcohol are reacted in the presence of a trace of mineral acid to form an ester. Exceptions to the foregoing general method of synthesizing ester intermediates useful in the processes of this invention are: (1) the preparation of β-(4-pyridyl)-acrylic acid by Kleiman and Weinhouse, J. Org. Chem., 10, 562 (1945) from chloral and γ-picoline, (2) the preparation of β-(2-thienyl)-acrylic acid by King and Nord, J. Org. Chem., 14, 405 (1949) from 2-thiophenecarboxaldehyde and malonic acid in the presence of pyridine, the method being that of Knoevenagel as modified by Doebner, (3) the preparation of ethyl α-methyl-β-(2-thienyl)-acrylate by Miller and Nord, J. Org. Chem., 15, 89 (1950), using the Reformatsky reaction between 2-thenaldehyde and ethyl α-bromopropionate in the presence of zinc, and (4) likewise a Reformatsky reaction, the preparation of ethyl α-methyl-β-(p-methoxyphenyl)-acrylate from anisaldehyde and ethyl α-bromopropionate in the presence of zinc according to Anwers and Auffenberg, Ber., 52, 92 (1919). Those ester intermediates of this invention wherein the carbon chain is saturated are obtained from the corresponding vinyl compounds by hydrogenation, using platinum oxide, 5% palladium on calcium carbonate, or the equivalent, as catalysts.

The following examples will illustrate in detail certain of the guanidine derivatives which constitute the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.), pressures in millimeters (mm.) of mercury, and relative amounts of materials in parts by weight, except as otherwise noted.

EXAMPLE 1

A. *p-Chloro-α-methylcinnamic acid.*—A stirred solution of 122 parts of p-chlorobenzaldehyde and 84 parts of freshly fused sodium propionate in 226 parts of propionic anhydride is heated at 160–165° C. (internal temperatures) for 48 hours. After dilution of the hot solution with 2000 parts of water, sufficient 50% aqueous caustic soda is introduced to render the mixture just alkaline to litmus, following which 50 parts of solid sodium carbonate is added. Unreacted aldehyde is removed by steam distillation, whereupon the hot raffinate is treated with decolorizing charcoal and then slowly poured into excess muriatic acid cooled with ice. The crude product thus precipitated is purified by crystallization from 15 volumes of benzene, using decolorizing charcoal in process. The p-chloro-α-methylcinnamic acid which results shows M. P. approximately 168° C.

B. *Methyl p-chloro-α-methylcinnamate.*—In accordance with the Fischer-Speier esterification technique, 120 parts of the acid of the foregoing Part A is dissolved in 475 parts of methyl alcohol containing 55 parts of sulfuric acid, and this solution refluxed for 6 hours. Excess solvent is stripped by vacuum distillation, following which the residue is mixed with ice and water. This mixture is extracted with ether which, in turn, is twice washed with 5% aqueous caustic soda, and finally with water. The purified extract, dried over anhydrous sodium sulfate, is distilled. That fraction boiling at 97–99° C. under 0.3 mm. pressure gives the desired methyl p-chloro-α-methylcinnamate. It shows $n_D^{25}$ 1.5761.

C. *p-Chloro-α-methylcinnamoylguanidine.*—A solution of 191 parts of guanidine hydrochloride in 250 parts of methyl alcohol is added with agitation to a cooled solution of 46 parts of sodium in 500 parts of methyl alcohol. After 5 minutes, the mixture is filtered; and the precipitate of sodium chloride thus removed is rinsed with a little cold methyl alcohol. Filtrate and rinse are combined, and solvent is removed therefrom by distillation in vacuo at temperatures below 50° C. The guanidine base thus obtained as a residue is combined with 421 parts of methyl p-chloro-α-methylcinnamate prepared as described in the foregoing Parts A and B. The resultant mixture is heated at approximately 90° C., with agitation, until the two immiscible phases initially present disappear to form a viscous, homogenous liquid. The time required for this operation is approximately 5 minutes. Upon standing at room temperatures overnight in a sealed container, the reaction product becomes crystalline. It is washed by successive trituration with 1200 parts of cyclohexane and, finally, 1600 parts of 5% aqueous caustic soda. Crystallization from 4 volumes of ethyl acetate, using decolorizing charcoal in process, gives p-chloro-α-methylcinnamoyl-guanidine as small white crystals, M. P. approximately 157° C. The product has the formula

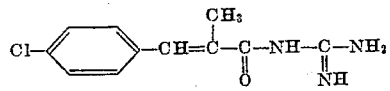

EXAMPLE 2

A. *Methyl β-(p-chlorophenyl)-α-methylpropionate.*—A solution of 210 parts of methyl p-chlorophenyl-α-methylcinnamate—prepared by the procedure of Example 1, Parts A and B—in 800 parts of absolute alcohol is reduced by hydrogen under a pressure of about three atmospheres over a period of 80 minutes using 1 part of platinum oxide as catalyst. After removal of the catalyst by filtration, distillation yields the desired methyl β-(p-chlorophenyl)-α-methylpropionate as a colorless oil, B. P. 79–83° C. at 0.3–0.4 mm. pressure.

B. *β-(p-Cholorophenyl)-α-methylpropionylguanidine.*—Interaction of 37 parts of the ester of the preceding Part A with 17 parts of guanidine hydrochloride and 4 parts of sodium in accordance with the technique detailed in Example 1C produces a viscous oil which, suspended in a mixture of 130 parts of 5% aqueous caustic soda and 40 parts of cyclohexane, crystallizes on standing. The product is—successively—filtered, rinsed free of alkali with water, dried, and crystallized twice from 33% aqueous alcohol (using decolorizing charcoal). The β-(p-chlorophenyl)-α-methylpropionylguanidine thus obtained shows M. P. approximately 139° C. and has the formula

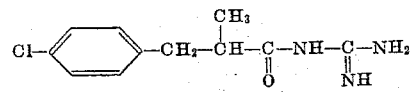

EXAMPLE 3

A. *3,4-dichlorocinnamic acid.*—A solution of 102 parts of 3,4-dichlorobenzaldehyde and 119 parts of malonic acid in 285 parts of pyridine containing 5 parts of piperidine is heated at approximately 90° C. for 3 hours. The hot solution is then poured into roughly 1000 parts of ice and water, following which sufficient muriatic acid is introduced to make the mixture acid. The precipitated product is filtered out and then dissolved in approximately 2000 parts of hot water containing sufficient potash to maintain alkalinity to phenolphthalein. A trace of insoluble matter is removed by filtration, whereupon the warm filtrate is acidified, precipitating the desired 3,4-dichlorocinnamic acid.

B. *Ethyl 3,4-dichlorocinnammate.*—A mixture of 102 parts of the dichloro acid of the preceding Part A, 400 parts of anhydrous alcohol, and 46 parts of sulfuric acid is heated at reflux temperatures for 12 hours in accordance with the Fischer-Speier esterification technique. After most of the solvent has been removed by distillation, the residue is poured into a large volume of ice water. This mixture is extracted with ether, following which the ether extract is washed, first with approximately 400 parts of 5% aqueous caustic soda, and then with water. Dried over anhydrous sodium sulfate, the extract is distilled, giving a colorless liquid fraction boiling at 122–125° C. under 0.2–0.3 mm. pressure. This material, the desired ethyl 3,4-dichlorocinnamate, crystallizes on cooling.

C. *3,4-dichlorocinnamoylguanidine.* — Approximately 53 parts of ethyl 3,4-dichlorocinnamate, 22 parts of guanidine hydrochloride, and 5 parts of sodium is reacted in accordance with the technique described in Example 1C to produce 3,4-dichlorocinnamoylguanidine. The crude product, triturated successively with approximately 80 parts of cyclohexane and 160 parts of 5% aqueous caustic soda, is rinsed well with water, then dried, and finally crystallized from 10 volumes of ethyl alcohol, using decolorizing charcoal in process. The white product thus obtained melts at approximately 201° C. (with decomposition) and has the formula

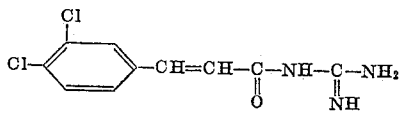

EXAMPLE 4

A. *3,4-dichloro-α-methylcinnamic acid.* — A stirred solution of 152 parts of 3,4-dichlorobenzaldehyde and 84 parts of freshly fused sodium propionate in 226 parts of propionic anhydride is heated at 160–165° C. (internal temperatures) for 48 hours. The cooled solution is diluted with 2000 parts of water, and the crystalline product which thereupon precipitates is recovered by filtration. This material is taken up in approximately 2000 parts of 2% aqueous caustic soda at around 95° C. The solution is treated with decolorizing charcoal and then filtered. From the warm filtrate, on acidification, is obtained the desired 3,4-dichloro-α-methylcinnamic acid. Recrystallized from 7 volumes of ethyl acetate, using decolorizing charcoal in process, the product shows M. P. approximately 154° C.

B. *Ethyl 3,4-dichloro-α-methylcinnamate.* — Fischer-Speier esterification of 141 parts of the acid of the preceding Part A with 560 parts of ethyl alcohol containing approximately 65 parts of sulfuric acid affords the desired ethyl 3,4-dichloro-α-methylcinnamate as a colorless liquid, B. P. approximately 122° C. at 0.3 mm. pressure.

C. *β - (3,4 - dichlorophenyl) - α - methylcinnamoylguanidine.*—Following the procedure of Example 1C, 259 parts of the ester of the preceding Part B is reacted with 100 parts of guanidine hydrochloride and 23 parts of sodium to produce a crystalline product which, triturated with approximately 800 parts of cyclohexane and then (after drying) with a like volume of 5% aqueous caustic soda, is rinsed with water, dried, and at last crystallized from approximately 6 volumes of ethyl acetate, using decolorizing charcoal in process. The pure white product so obtained has a melting point of about 175° C. Its formula is

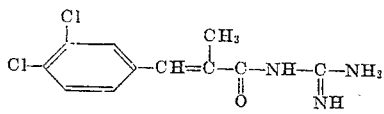

EXAMPLE 5

A. *p-Methoxycinnamic acid.*—A solution of 165 parts of p-anisaldehyde, 195 parts of malonic acid, 220 parts of pyridine, and 3 parts of piperidine is heated at approximately 90° C. for 16 hours. The cooled reactants are poured into a cold mixture of 350 parts of muriatic acid and 300 parts of water. The crude p-methoxycinnamic acid which precipitates is filtered out and then taken up in 2000 parts of water containing 60 parts of caustic soda at around 90° C. This solution is treated with decolorizing charcoal and then filtered, using a filter aid. The filtrate is cooled to room temperatures and then acidified, again precipitating the desired acid, which this time is recovered and recrystallized from approximately 5 volumes of acetic acid, using decolorizing charcoal in process. The colorless product shows M. P. approximately 188° C.

B. *Ethyl p-methoxycinnamate.*—Fischer-Speier esterification of 100 parts of the acid of the preceding Part A with 400 parts of ethyl alcohol containing 46 parts of sulfuric acid affords ethyl p-methoxycinnamate as a colorless oil, B. P. approximately 120° C. at 0.3 mm. pressure. The material sets to a solid which shows M. P. 48–49° C.

C. *p-Methoxycinnamoylguanidine.*—Interaction of 412 parts of ethyl p-methoxycinnamate, 191 parts of guanidine hydrochloride, and 23 parts of sodium in accordance with the technique of Example 1C affords a crude product which, triturated with 1600 parts of 5% aqueous caustic soda, is rinsed with water, then dried, and finally crystallized from 5 volumes of isopropyl alcohol—using decolorizing charcoal in process—to give the desired p-methoxycinnamoylguanidine as shiny white plates, M. P. approximately 183° C. The product has the formula

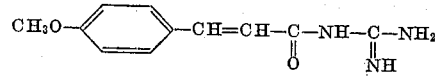

EXAMPLE 6

*p-Methoxy-α-methylcinnamoylguanidine.*—Reaction of 96 parts of ethyl α-methyl-β-(p-methoxyphenyl)-acrylate—prepared by the method of Anwers and Auffenberg, loc. cit.—42 parts of guanidine chloride, and 10 parts of sodium in accordance with the technique detailed in Example 1C yields a glass. Addition of 260 parts of 5% aqueous caustic soda and 125 parts of cyclohexane, followed by vigorous agitation, brings about crystallization after approximately 1 hour. The product is recrystallized from 5 volumes of isopropyl alcohol, using decolorizing charcoal in process. The pure white material thus obtained shows M. P. 135° C. It has the formula

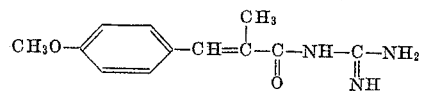

EXAMPLE 7

A. *Methyl β-(2 - thienyl)-acrylate.*—β-(2 - thienyl)-acrylic acid—prepared by the method of King and Nord, loc. cit.—is subjected to Fischer-Speier esterification with methyl alcohol and sulfuric acid to give methyl β-(2-thienyl)-acrylate as a colorless oil, B. P. approximately 135° C. at 12 mm. pressure.

B. *β-(2-thienyl)-acrylylguanidine.*—The reaction of 51 parts of methyl β-(2-thienyl)-acrylate with 29 parts of guanidine hydrochloride and 7 parts of sodium by the procedure described in Example 1C affords dense white crystals of β-(2-thienyl)-acrylylguanidine. This material—as crystallized from ethyl acetate, using decolorizing charcoal in process—shows M. P. approximately 163° C. It has the formula

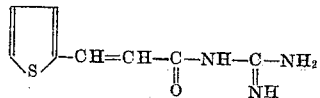

EXAMPLE 8

*α-Methyl-β-(2 - thienyl) - acrylylguanidine.*—The treatment of 48 parts of methyl α-methyl-β-(2-thienyl)-acrylate—prepared by Fischer-Speier esterification of the α-methyl-β-(2-thienyl)-acrylic acid resulting from hydrolysis according to usual techniques of the ethyl α-methyl-β-(2-thienyl)-acrylate of Miller and Nord, loc. cit.—with the base prepared from 25 parts of guanidine hydrochloride and 6 parts of sodium as described in Example 1C gives, in good yield, α-methyl-β-(2-thienyl)-acrylylguanidine. The product is purified by trituration with 5% aqueous caustic soda, washing with water, and crystallizing from ethyl acetate (using decolorizing charcoal), in that order. α-Methyl-β-(2-thienyl)-acrylylguanidine is obtained as dense white crystals, M. P. 143–144° C. It has the formula

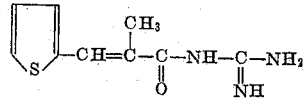

EXAMPLE 9

*β-(2-furyl)-acrylylguanidine.*—In accordance with the technique of Example 1C, 332 parts of ethyl β-(2-furyl)-acrylate, 191 parts of guanidine hydrochloride, and 46 parts of sodium are reacted together to produce β-(2-furyl)-acrylylguanidine. After successive trituration with 5% aqueous caustic soda and cyclohexane, the material is crystallized from 5 volumes of isopropyl alcohol as a dense white solid, M. P. approximately 181° C. (with decomposition). The hydrochloric acid addition salt of this material melts at approximately 260° C. (with decomposition). The formula of the base is

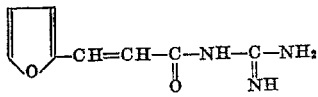

EXAMPLE 10

A. *α-Methyl-β-(2-furyl)-acrylic acid.*—A mixture of 96 parts of furfural, 96 parts of freshly fused sodium propionate, and 260 parts of propionic anhydride is heated with agitation at approximately 135° C. (internal temperature) for 26 hours. The reactants are cooled and then diluted with 1250 parts of water. Sufficient sodium carbonate is introduced to effect alkalinity to litmus, following which the materials are agitated with decolorizing charcoal over a 3 hour period, thereby coagulating tarry impurities. Filtration is followed by acidification of the clear yellow filtrate with dilute aqueous sulfuric acid to precipitate the desired β-(2-furyl)-α-methylacrylic acid. The nearly colorless product shows M. P. 117–118° C.

B. *Ethyl β - (2 - furyl) - α - methylacrylate.*—Fischer-Speier esterification of 58 parts of the acid of the preceding Part A with approximately 230 parts of absolute alcohol in the presence of 27 parts of sulfuric acid gives, after 12 hours at reflux temperatures, the desired ester. The product, worked up by usual techniques, is obtained as a pale yellow oil, B. P. 71–72° C. at 0.4 mm. pressure. It has $n_D^{25}$ 1.5442.

C. *β-(2-furyl)-α-methylacrylylguanidine.*—Interaction of 180 parts of the ester of the preceding Part B, 95 parts of guanidine hydrochloride, and 23 parts of sodium, using the procedure detailed in Example 1C, affords a crude product which, after trituration with 5% aqueous caustic soda and then with cyclohexane, is finally purified by crystallization from ethyl acetate, using decolorizing charcoal in process. The β-(2-furyl)-α-methylacrylylguanidine thus obtained shows M. P. approximately 138° C. It has the formula

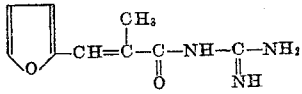

EXAMPLE 11

A. *Ethyl β - (2 - furyl)-α-methylpropionate.*—Approximately 47 parts of the ethyl ester of the preceding Example 10A is dissolved in 160 parts of absolute alcohol and reduced with hydrogen under 3 atmospheres of pressure, using 2 parts of 5% palladium on calcium carbonate as catalyst. The reduction is complete in approximately 25 minutes. After filtration to remove catalyst, the product is distilled. The colorless fraction boiling at 47–48° C. under 0.25 mm. pressure is the desired β-(2-furyl)-α-methylpropionic acid ethyl ester. It has $n_D^{25}$ 1.4559.

B. *β-(2-Furyl)-α-methylpropionylguanidine.*—From 33 parts of the ester of the foregoing Part A, 17 parts of guanidine hydrochloride, and 4 parts of sodium reacted together in accordance with the technique of Example 1C is obtained a glass which crystallizes upon agitation with a mixture of 120 parts of 5% aqueous caustic soda and approximately 40 parts of cyclohexane. Recrystallized from 10 volumes of water, using decolorizing charcoal in process, the β-(2-furyl)-α-methylpropionylguanidine thus obtained shows M. P. 137–138° C. It has the formula

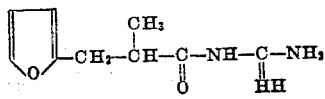

EXAMPLE 12

A. *Ethyl β-(4-pyridyl)-acrylate.*—β-(4-pyridyl)-acrylic acid—obtained by the method of Kleiman and Weinhouse, loc. cit.—is converted to the methyl ester by the Fischer-Speier procedure. After crystallization from cyclohexane, the ester thus obtained shows M. P. approximately 76° C.

B. *β-(4-pyridyl)-acrylylguanidine.*—Treatment of 78 parts of the ester of the preceding Part A with the base obtained by interaction of 46 parts of guanidine hydrochloride and 11 parts of sodium yields a glassy product which solidifies on standing. The material is taken up in 400 parts of water containing 48 parts of muriatic acid. The desired base is recovered by addition of a cold concentrated aqueous solution of 40 parts of caustic soda. The product thus obtained shows M. P. approximately 218° C. (with decomposition). Recrystallization from 80 volumes of alcohol does not improve this melting point. The product has the formula

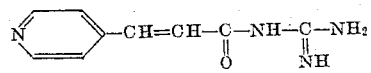

I claim:
1. A compound of the formula

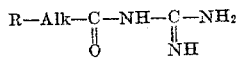

wherein R is selected from the group consisting of furyl, pyridyl, and thienyl radicals, and phenyl radicals substituted by members of the group consisting of lower alkoxyl radicals and halogen of atomic number greater than 9 and less than 53; and Alk is selected from the group consisting of alkylene and alkenylene radicals containing at least 2 and less than 4 carbon atoms.

2. A compound of the formula

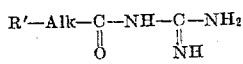

wherein R′ is a thienyl radical and Alk is an alkenylene radical containing at least 2 and less than 4 carbon atoms.

3. α-Methyl-β-(2-thienyl)-acrylylguanidine.
4. A compound of the formula

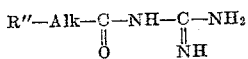

wherein R″ is a furyl radical and Alk is an alkenylene radical containing at least 2 and less than 4 carbon atoms.

5. β-(2-furyl)-α-methylacrylguanidine.
6. A compound of the formula

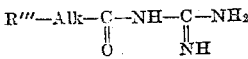

wherein R‴ is a halophenyl radical in which the halogen present has an atomic number greater than 9 and less than 53, and Alk is an alkenylene radical containing at least 2 and less than 4 carbon atoms.

7. A compound of the formula

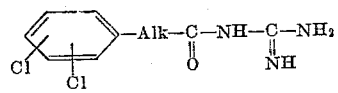

wherein Alk is an alkenylene radical containing at least 2 and less than 4 carbon atoms.

8. 3,4-dichlorocinnamoylguanidine.
9. In a process for preparation of compounds of the formula

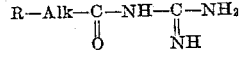

wherein R is selected from the group consisting of furyl, pyridyl, and thienyl radicals, and phenyl radicals substituted by members of the group consisting of lower alkoxyl radicals and halogen of atomic number greater than 9 and less than 53, and Alk is selected from the group consisting of alkylene and alkenylene radicals containing at least two and less than four carbon atoms, the step which comprises reacting guanidine with an ester of the formula $$R-Alk-\underset{\underset{O}{\|}}{C}-OZ$$

wherein R and Alk have the meanings hereinbefore assigned and Z is a lower alkyl radical, reaction temperatures being between 50° and 150° centigrade.

10. A compound of the formula $$R_a-Alk-\underset{\underset{O}{\|}}{C}-NH-\underset{\underset{NH}{\|}}{C}-NH_2$$

wherein $R_a$ is a pyridyl radical and Alk is an alkenylene radical containing at least 2 and less than 4 carbon atoms.

11. β-(4-pyridyl)-acrylylguanidine.

12. A compound of the formula $$R_b-Alk-\underset{\underset{O}{\|}}{C}-NH-\underset{\underset{NH}{\|}}{C}-NH_2$$

wherein $R_b$ is a phenyl radical containing a lower alkoxyl substituent, and Alk is an alkenylene radical containing at least 2 and not less than 4 carbon atoms.

13. p-Methoxy-α-methylcinnamoylguanidine.

14. In a process for preparation of compounds of the formula $$R-Alk-\underset{\underset{O}{\|}}{C}-NH-\underset{\underset{NH}{\|}}{C}-NH_2$$

wherein R is selected from the group consisting of furyl, pyridyl, and thienyl radicals, and phenyl radicals substituted by members of the group consisting of lower alkoxyl radicals and halogen of atomic number greater than 9 and less than 53; and Alk is selected from the group consisting of alkylene and alkenylene radicals containing at least 2 and less than 4 carbon atoms, the step which comprises reacting guanidine with an ester of the formula $$R-Alk-\underset{\underset{O}{\|}}{C}-OCH_3$$

wherein R and Alk have the meanings hereinbefore assigned, reaction temperatures being in the range 85–110° C.

No references cited.